United States Patent [19]

Lapeyre

[11] Patent Number: 4,821,872
[45] Date of Patent: * Apr. 18, 1989

[54] LIGHTWEIGHT MODULAR CONVEYOR BELT

[75] Inventor: James M. Lapeyre, New Orleans, La.

[73] Assignee: The Laitram Corporation, New Orleans, La.

[ * ] Notice: The portion of the term of this patent subsequent to Dec. 3, 2002 has been disclaimed.

[21] Appl. No.: 39,759

[22] Filed: Apr. 17, 1987

Related U.S. Application Data

[63] Continuation of Ser. No. 750,896, Jul. 1, 1985, abandoned, which is a continuation-in-part of Ser. No. 457,482, Jan. 12, 1983, Pat. No. 4,556,142.

[51] Int. Cl.$^4$ .............................................. B65G 17/06
[52] U.S. Cl. ..................................................... 198/853
[58] Field of Search ................................ 198/851–853; 474/207, 232, 234

[56] References Cited

U.S. PATENT DOCUMENTS

| | | | |
|---|---|---|---|
| 3,641,831 | 2/1972 | Palmaer | 198/853 |
| 4,051,949 | 10/1977 | Lapeyre | 198/853 |
| 4,159,763 | 7/1979 | Kewley et al. | 198/853 |
| 4,213,527 | 7/1980 | Lapeyre et al. | 198/853 |
| 4,556,142 | 12/1985 | Lapeyre | 198/853 |

FOREIGN PATENT DOCUMENTS

| | | | |
|---|---|---|---|
| 113909 | 7/1984 | European Pat. Off. | 198/853 |
| 2712248 | 10/1978 | Fed. Rep. of Germany | 198/853 |

Primary Examiner—Joseph E. Valenza
Attorney, Agent, or Firm—Weingarten, Schurgin, Gagnebin & Hayes

[57] ABSTRACT

A conveyor belt composed of interconnected identical modules of integral plastic molded construction. Each of the modules includes a multiplicity of elongated parallel spaced link elements having first and second pluralities of link ends and an intermediate section of a grid-like structure between the link ends. The link ends each include a portion projecting from one side of each of the link elements along the pivotal axis of the module. The portions extend from the same facing side for each group of link ends, such that when adjacent modules are linked together the projecting portions of adjacent link ends are rotated 180° with respect to each other, in that the projecting portions of the link ends of each adjoining module extend in opposite directions. Thus, the flat sides of the linked ends of mated modules are in engagement to provide only a very small offset in the line of pull through the adjacent link elements to minimize bending forces in the links and link ends.

6 Claims, 6 Drawing Sheets

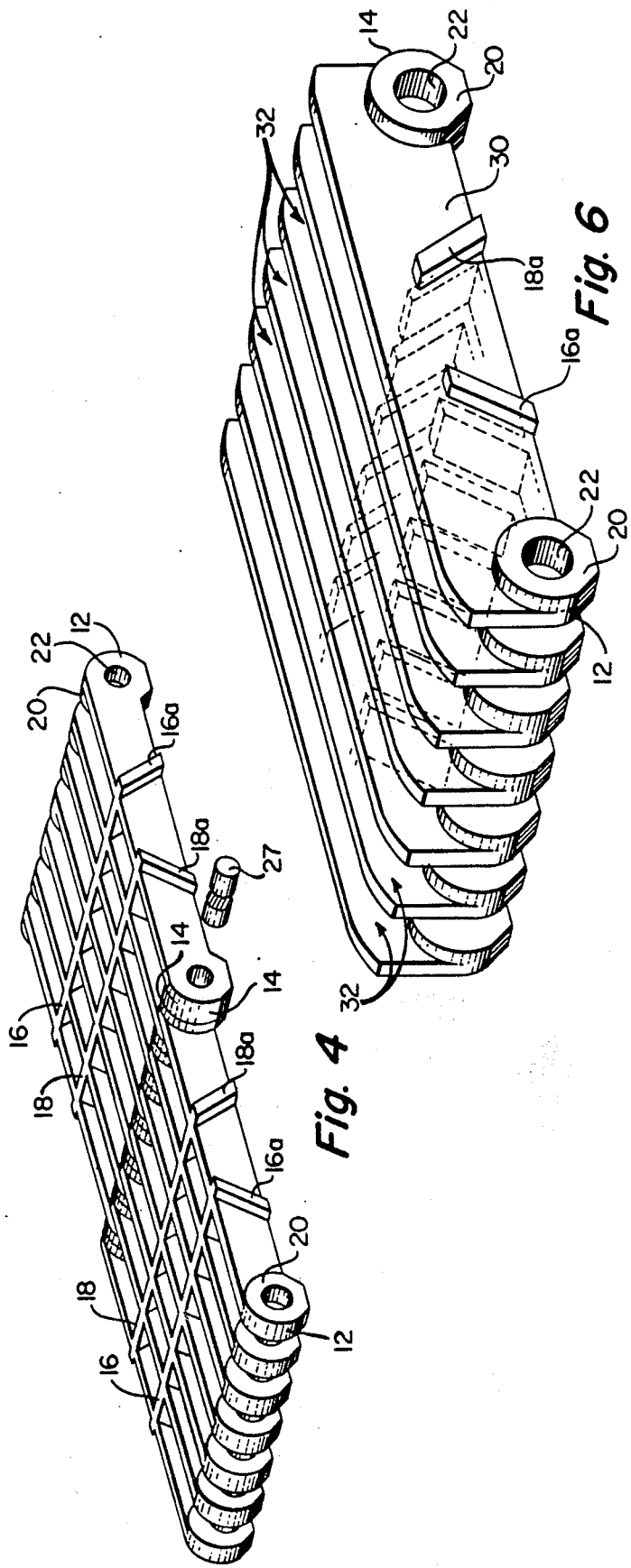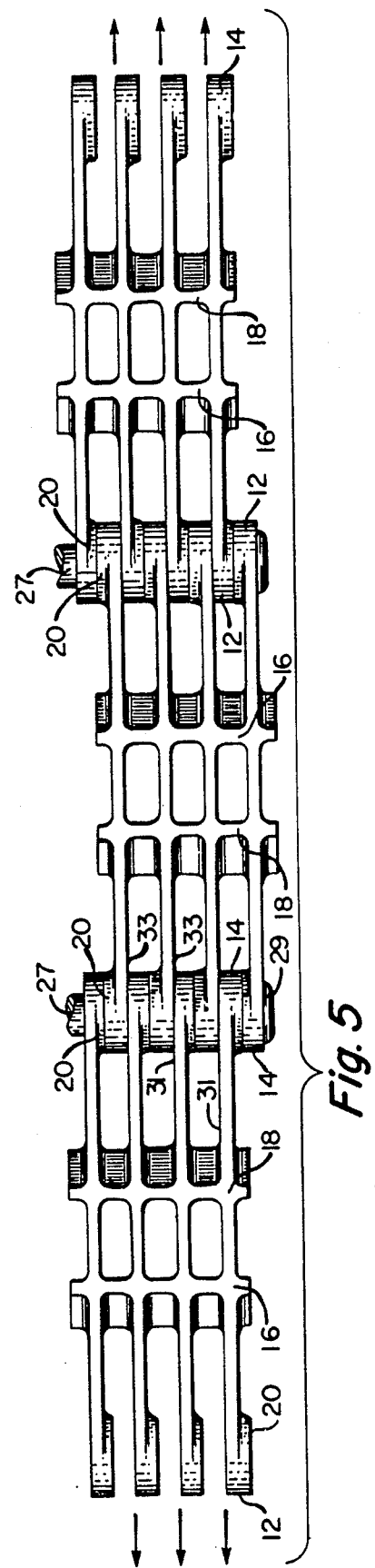

LIGHTWEIGHT MODULAR CONVEYOR BELT

CROSS REFERENCE TO RELATED APPLICATIONS

This application is a continuation of application Ser. No. 750,896, filed July 1, 1985, abondoned, a continuation-in-part of application Ser. No. 457,482, entitled LIGHTWEIGHT MODULAR CONVEYOR BELT, filed Jan. 12, 1983, issued as U.S. Pat. No. 4,556,142.

FIELD OF THE INVENTION

This invention relates to conveyor belts and modules for the construction thereof, and more particularly to a modular conveyor belt comprising interconnected modules of the same integral construction.

BACKGROUND OF THE INVENTION

Modular conveyor belts are known which comprise modules pivotally connected to one another, each module being molded as a single unit, preferably of a plastic material. Such conveyor belts are shown, for example, in U.S. Pat. Nos. 3,870,141 and 4,051,949 of the same inventor and asignee as herein. Each module includes a number of parallel spaced links having end sections with aligned holes for accommodation of pivot rods, and intermediate sections joined by integral cross members to form a rigid supporting grid. The upper portions of the links and intermediate sections define a conveyor surface on which a product is carried. Alternatively, the link elements can extend upwardly to a plane which is above the plane of the upper portions of the intermediate sections to provide raised link elements or raised ribs which define parallel longitudinal channels between adjacent links, and in which channels a conveyor comb can be disposed for transfer to a product to and from the conveyor belt, as shown in the aforesaid U.S. Pat. No. 4,051,949.

In co-pending application Ser. No. 179,523 filed Aug. 19, 1980, abandoned for continuation application Ser. No. 844,537, filed Mar. 26, 1986, a conveyor module is shown which includes sprocket recesses located midway between the pivot axes and which are adapted to mate with corresponding sprocket teeth of an associated sprocket wheel. The sprocket recesses are provided by angled surfaces of the intermediate sections. These intermediate sprocket recesses provide the benefit of minimizing chordal action and scrubbing between the mating surfaces of the module and sprocket.

SUMMARY OF THE INVENTION

The present invention provides a conveyor belt and module which is similar to, and an improvement over the aforesaid structures. The conveyor belt is composed of a plurality of interconnected modules, each of identical construction and each including a multiplicity of elongated spaced link elements terminating in first and second pluralities of link ends. An intermediate section between the pluralities of link ends is of a grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. The link ends each include a projecting portion that extends from one side of each of the link elements along the transverse or pivotal axis of the module. The portions extend in the same direction and from the same facing side of each plurality of link ends. The opposite side of the link ends are substantially flat and have only minimal, if any, outward projection. The link ends and extending portions contain openings which are aligned on respective pivotal axes of the module for accommodation of pivot rods by which interconnected modules are retained in linking engagement. In one embodiment, the portions are constituted as cylindrical projections. In a further embodiment, raised ribs integral with the link elements are dimensioned to define the portions.

The modules in both embodiments are linked together such that the extending or projecting portions of the link ends of each module are rotated 180° with respect to the link ends of an adjacent mated module such that that the extending portions of each adjacent module extend in opposite directions. The flat sides of the linked ends of mated modules are in engagement to provide a very small offset in line of pull through the adjacent link elements. As a result, the line of pull through the pivot rod is substantially in a shear condition, since the shear point is near the tensile members, thereby minimizing bending forces on the linked ends.

DESCRIPTION OF THE DRAWINGS

The invention will be more fully understood from the following detailed description taken in conjunction with the accompanying drawings, in which:

FIG. 4 is a pictorial view of interconnected modules of FIG. 1;

FIG. 5 is a top view of interconnected modules of FIG. 1;

FIG. 6 is a pictorial view of an alternative embodiment of the module of FIG. 1;

DETAILED DESCRIPTION OF THE INVENTION

Figure 1:
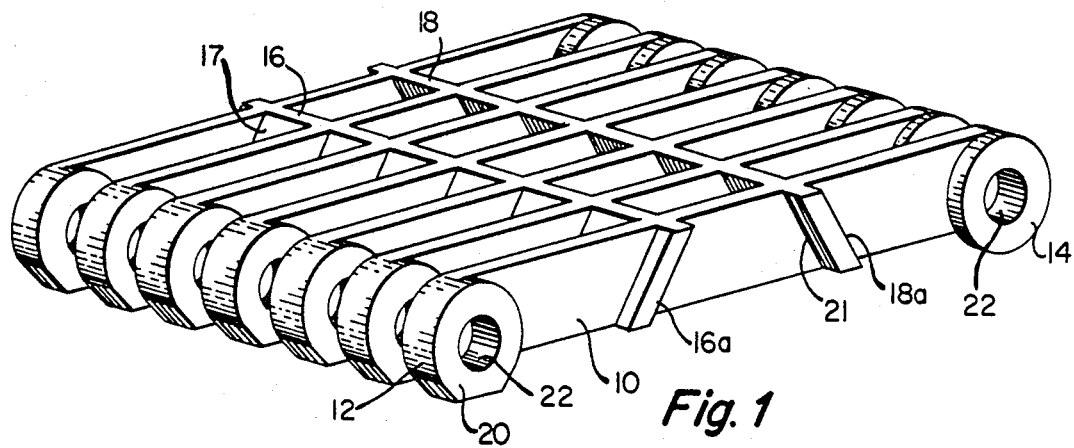
FIG. 1 is a pictorial view of a conveyor module embodying the invention.
Figure 2:
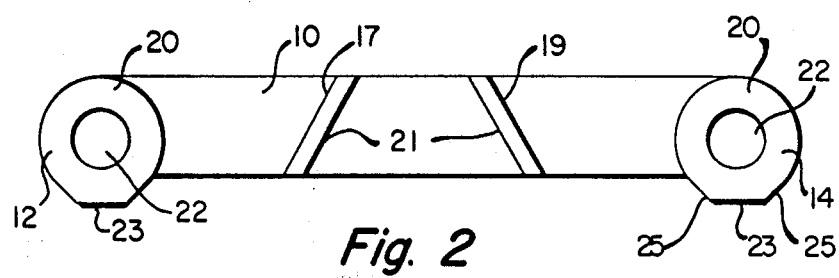
FIG. 2 is a side view of the module of FIG. 1.
Figure 3:
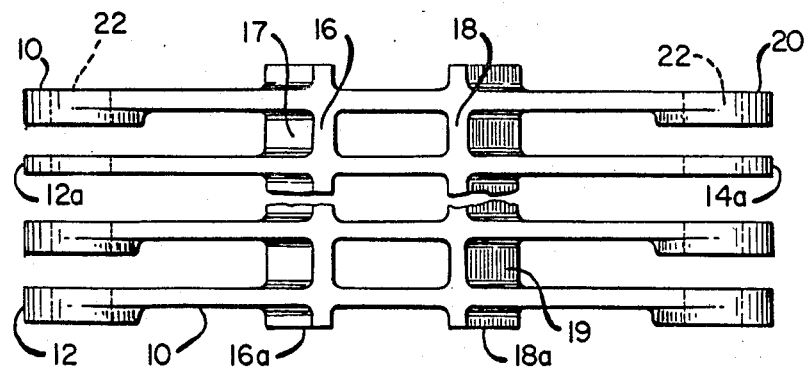
FIG. 3 is a cutaway top view of the module of FIG. 1.

A conveyor belt module in accordance with the invention is shown in FIGS. 1-3 and is integrally formed of a plastic material by a plastic molding process. The module includes a plurality of linear link elements 10, each terminating in respective link ends 12 and 14 arranged in parallel relationship across the width of the module. The link elements 10 are spaced and joined by first and second transverse members 16 and 18 which have upper and lower edges which are coplanar with the respective upper and lower edges of the link elements 10. The transverse member 16 has sloping surfaces 17 which downwardly and outwardly extend toward link ends 12, while the transverse member 18 has sloping surfaces 19 which downwardly and outwardly extend toward link ends 14, the confronting sloping surfaces 21 defining sprocket recesses between the pivot axes and which are collinear with the spacing between adjacent link elements 10. The link elements 10 and transverse members 16 and 18 are preferably of uniform thickness to facilitate molding and preferably provide uniform thermal expansion and contraction in response to ambient temperature conditions. The open grid construction prevents any significant bending of the module about its longitudinal or transverse axes.

The link ends 12 and 14 each include a generally cylindrical projection 20 which extends from one side of each of the link elements along the transverse or pivotal axis of the module. The projections 20 extend from the same facing side of each link element, the opposite side of the link elements being substantially flat and with minimal, if any, outward projection. The link ends and projections 20 contain openings 22 which are aligned on respective pivotal axes of the module. The transverse members 16 and 18 include portions 16a and 18a which extend from the outer sides of the outer link elements 10 by an amount equal to the outward extent of the projections 20. The portions 16a and 18a serve to abut like portions of laterally adjacent modules to provide lateral support therefor. In the illustrated embodiment, the link ends include flattened sections 23 which serve as wear surfaces for riding on conveyor strips or support surfaces. The sloped surfaces 25 are for ease of mold construction. The surfaces 23 and 25 are not necessary but are convenient features.

The modules are linked together with like modules as shown in FIGS. 4 and 5. Each module is rotated 180° with respect to the mated modules such that the projections 20 of each adjacent module extend in opposite directions. A pivot rod or pin 27 is inserted in the aligned openings 22 of interconnected modules and retains the modules for pivotal movement with respect to each other. The pivot rods are typically formed of the same or compatible plastic material as the modules themselves, and are typically retained in the modules by headed ends 29 formed on the pivot rods. The flat sides 31 of the link ends of one module are in engagement with the flat sides 33 of the link ends of a mated module, as best seen in FIG. 5, to provide a very small offset in the line of pull through the adjacent link elements. As a result, the line of pull through the pivot rod is nearly in a pure shear condition, since the shear point is near the tensile members 10, thereby minimizing bending forces in the links 10 and in the link ends.

The projections 20 have a thickness slightly less than the spacing between adjacent link ends such that the link ends fit within the corresponding spacings of adjacent modules and are pivotable with respect thereto. The projections provide sufficient bearing surface with the pivot rod to accommodate the tensile forces on the belt during its driven operation.

Figure 7:
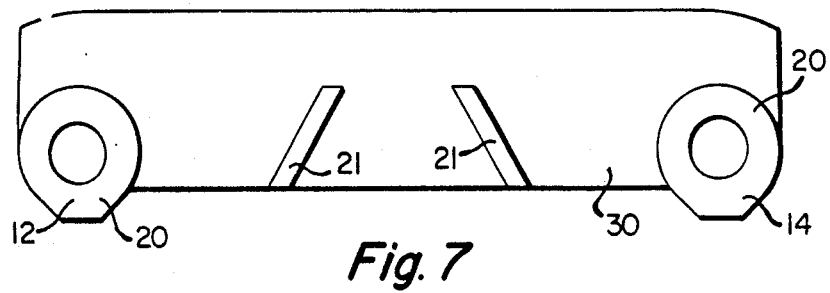
FIG. 7 is a side view of the module of FIG. 6.
Figure 8:
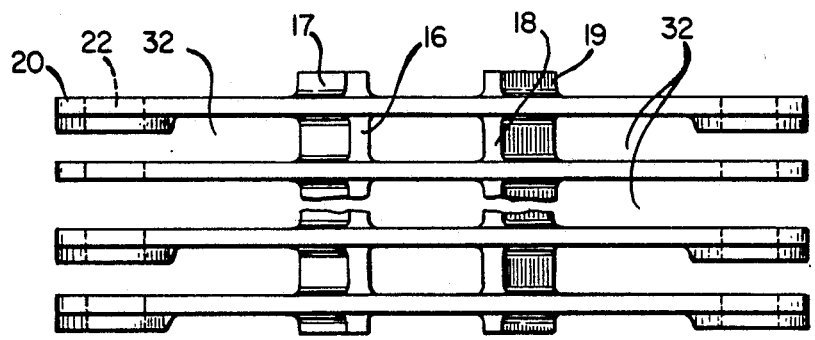
FIG. 8 is a cutaway top view of the module of FIGS. 6 and 7.
Figure 9:
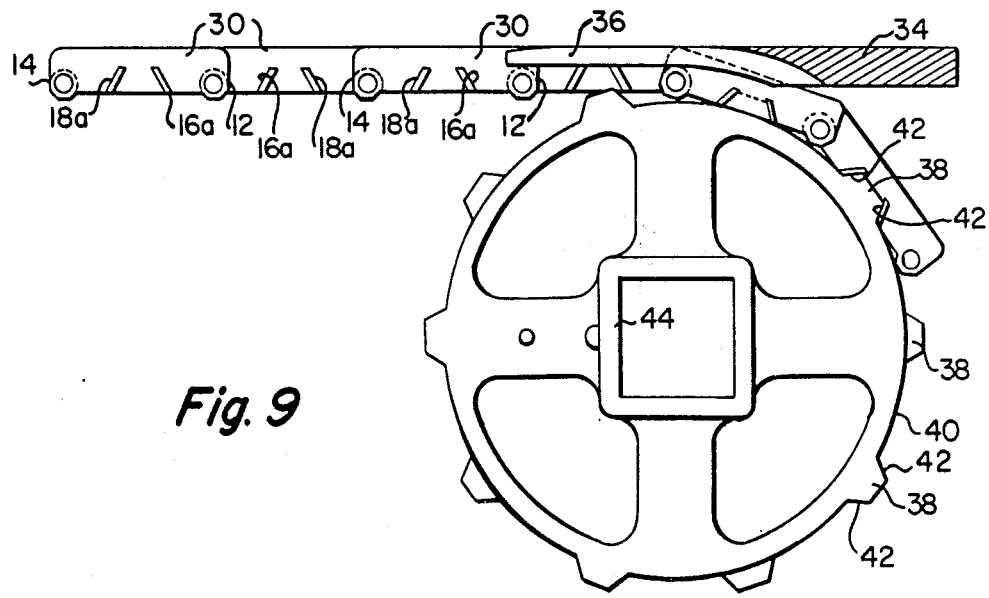
FIG. 9 is an elevation view of a modular conveyor belt embodying the module of FIG. 6 with a sprocket wheel and conveyor comb.
Figure 10:
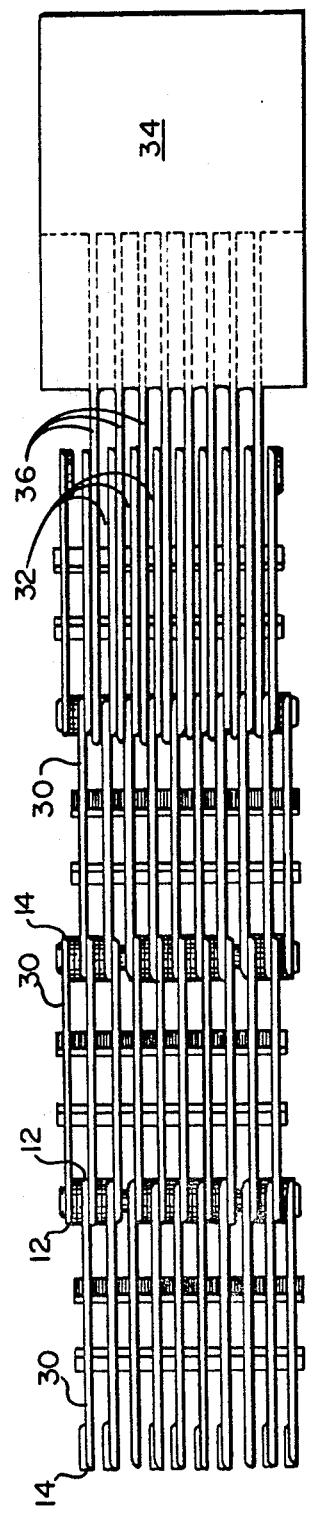
FIG. 10 is a top view of interconnected modules of FIG. 6 and cooperative with a conveyor comb.

An alternative module embodiment is shown in FIGS. 6-8 wherein the link elements 30 each extend upwardly to a plane which is above the plane at which the upper surfaces of the transverse members 16 and 18 terminate. These raised link elements, or raised ribs, define parallel longitudinal channels 32 between adjacent link elements. A conveyor comb 34 has its tines 36 disposed within the channels 32 in the manner shown in FIGS. 9 and 10, the upper surfaces of the tines being substantially at or slightly below the conveying surface and by which a product is removed from the conveyor belt as the conveyor traverses a downwardly curved path, as shown in FIG. 9. A module having raised ribs and usable with a conveyor comb is shown in U.S. Pat. No. 4,051,949 of the same inventor as herein and is also shown in co-pending application Ser. No. 179,523, abandoned for continuation application Ser. No. 844,537 filed Mar. 26, 1986.

Figure 16:
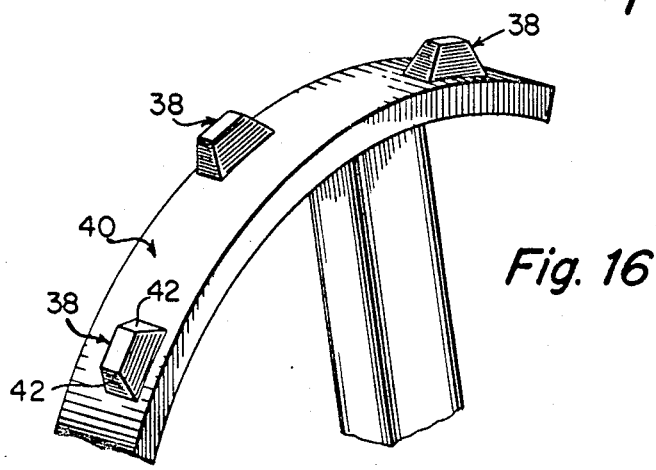
FIG. 16 is a partial perspective view of a sprocket wheel useful in the invention.

The inclined portions 17 and 19 of the transverse members 16 and 18 have confronting inner surfaces 21 which define sprocket recesses centrally disposed between the piot axes of the module. The sprocket recesses are adapted to mate with corresponding sprocket teeth 38 of an associated sprocket wheel 40, as shown in FIG. 9. The sprocket wheel has teeth 38 with paralle side surfaces, and inclined front and back surfaces 42 configured to engage the corresponding surfaces 21 of the sprocket recesses. The teeth 38 are laterally offset to accommodate the offset recesses of the mated modules, as seen in FIG. 16. In the illustrated embodiment, the sprocket wheel 40 has a hub 44 adapted to be secured to a square shaft, and a plurality of sprocket wheels are employed across the width of the module to provide intended support and driving force. The centrally driven sprocket recesses provide the benefits of minimizing chordal action and scrubbing between the mating surfaces of the module and the sprocket wheel.

A centrally disposed sprocket recess employed in a different module is shown in co-pending application Ser. No. 179,523, abandoned for continuation application Ser. No. 844,537, filed Mar. 26, 1986, of the same inventor as herein, and can be considered the inverse of the center sprocket tooth shown in co-pending application Ser. No. 228,154, filed Jan. 23, 1981, for a LINK BELT CHAIN, abandoned for continuation application Ser. No. 483,210, filed Apr. 4, 1983, of the same inventor. The placement of the sprocket recesses midway between the pivot and driving the modules at this mid-position, rather than driving the modules at the position of the pivot axes, provides substantially constant speed drive of the conveyor belt, substantially eliminatse sprocket-to-belt wear, and provides a belt capable of faster running speeds than conventional belts by reason of the minimized chordal action and scrubbing. The inclined surfaces also serve to present greater surface area to water and/or steam jets which can be located above and below the modules for cleaning of the belt. The inclined surfaces also facilitate visual inspection of the belt.

The modules are preferably made in widths which are multiples of the smallest module width so that they can be arranged in brick-laid fashion to provide a conveyor belt of intended overall width. The modules are staggered laterally such that a module straddles laterally adjacent modules to achieve a belt which resists bending across the width of the belt.

The modules are preferably fabricated as an integral unitary structure by injection molding of a plastic material such as polyethylene and polypropylene. The particular plastic material is determined in accordance with the characteristics desired to suit a particular operating environment. The pivot rods are typically of the same or compatible plastic material.

Figure 11:
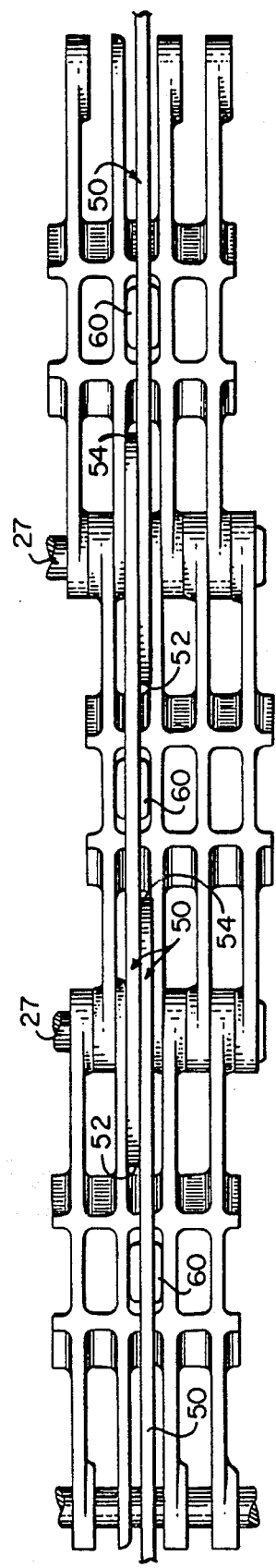
FIG. 11 is a cutaway top view of interconnected modules including side guards.
Figure 12:
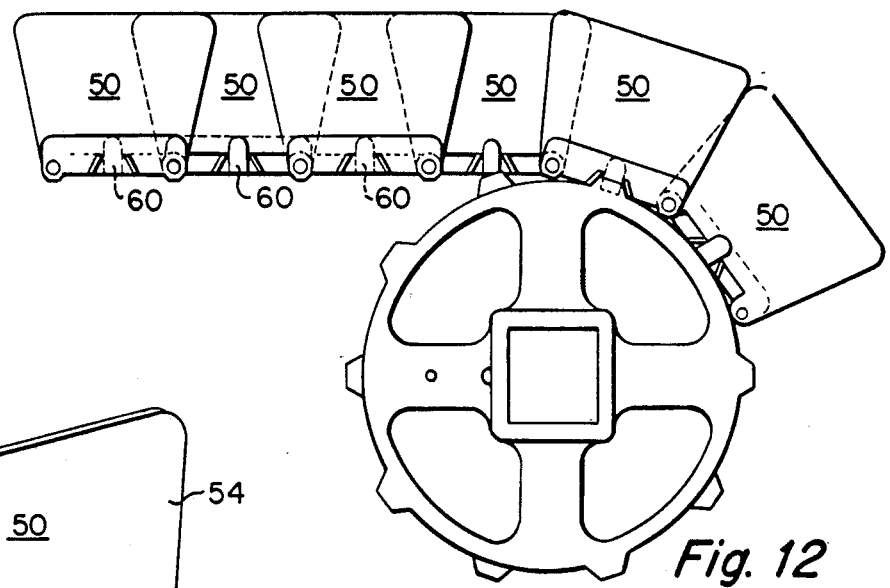
FIG. 12 is an elevation view of interconnected modules including side guards and cooperative with a sprocket wheel.
Figure 13:
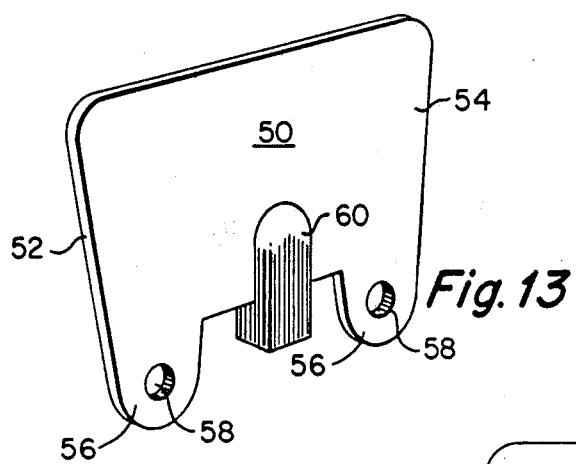
FIGS. 13, 14, and 15 are pictorial, side, and end views, respectively, of side guards useful with the conveyor belt of the invention.
Figures 14, 15:
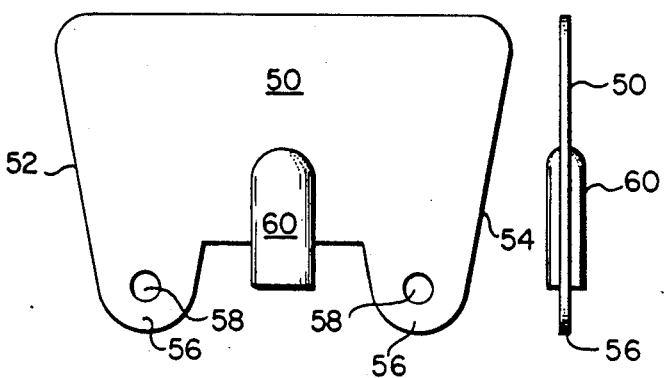

Selected link ends of the modules can have their lateral projections removed, as shown at link ends 12a and 14a in FIG. 3. The projections can be eliminated during fabrication of the module or can be removed after such fabrication, such as by machining the intended projections from the associated link ends. The increased spacing provided by the absence of projections provides room for belt attachments such as the side guards 50 illustrated in FIGS. 11-15. The side guard is of molded plastic having a relatively thin plate-like body with inwardly sloped edges 52 and 54, and a downwardly extending pair of flanges 56, each having an opening 58 therethrough. The flanges 56 and openings 58 are sized to be of the same pitch length as the associated module, and to fit into the projection-less link ends to be retained therein by the pivot rod 27, in the manner illustrated in FIG. 11. A rib 60 protrudes from each side and downwardly of the guard 50 to provide for strengthening and stiffening thereof and is adapted to fit into the upper openings of the modules. The side guards are assembled with the ends overlapping, as seen in FIG. 12. As the connected modules are conveyed around a sprocket wheel, the adjacent guards slidably move but remain in overlapping engagement to provide an effectively continuous side barrier for the belt. Typically, side guards are employed under the side edges of the connected modules to contain a product within a channel between the pair of guards. Alternatively, guards can be provided along the center of the conveyor belt to separate the belt into left and right halves, as is desirable for some conveying purposes.

A further comveyor module embodiment is shown in FIGS. 17-21. Each of the modules includes a plurality of stepped-link elements 10′, each terminating in respective link ends 12′ and 14′ and arranged in laterally spaced relationship across the width of the module. The boundary of a conveyor formed by such stepped modules thereby defines a generally rectangular configuration, not specifically illustrated. The link elements 10′ are spaced and joined by first and second transverse members 16′ and 18′ which have upper and lower edges which are coplanar with the respective upper and lower edges of the link elements 10′ as can best be seen in FIGS. 19 through 21. The transverse member 16′ has sloping surfaces 17′ which downwardly and outwardly extend toward link ends 12′, while the transverse member 18′ has sloping surfaces 19′ which downwardly and outwardly extend toward link ends 14′, the confronting sloping surfaces 21′ (FIG. 19) defining sprocket recesses centrally disposed between the pivot axes. The link elements 10′ and transverse members 16′ and 18′ define an open grid construction that prevents any significant bending of the module about its longitudinal or transverse axes.

The cross members 16′, 18′ have upper and lower surfaces 50′, 52′ (FIG. 19), coplanar with respective upper and lower surfaces 55, 56′ (FIG. 19) of the link elements. Stepped-ribs 58′ (FIG. 18) are integrally formed with the upper surfaces of the links and extend from link end to link end. As can best be seen in FIGS. 18, 20, 21, the dimensions of the ribs 58′ are selected to be less than the corresponding dimensions of said link ends defining a transversely extending portion 60′ projecting toward a confronting link end and terminating short of the confronting link by an amount to accommodate the link end of a mated module. The portions 60′ have a body configuration that defines central openings 62 therethrough which are aligned on respectively pivotal axes of the modules. A pivot rod or pin 27′ is inserted in aligned openings 62 of interconnected modules and retains the modules for pivotal movement with respect to each other. The portions 60′ have a body configuration that wholly surrounds the pivot rods.

Figure 17:
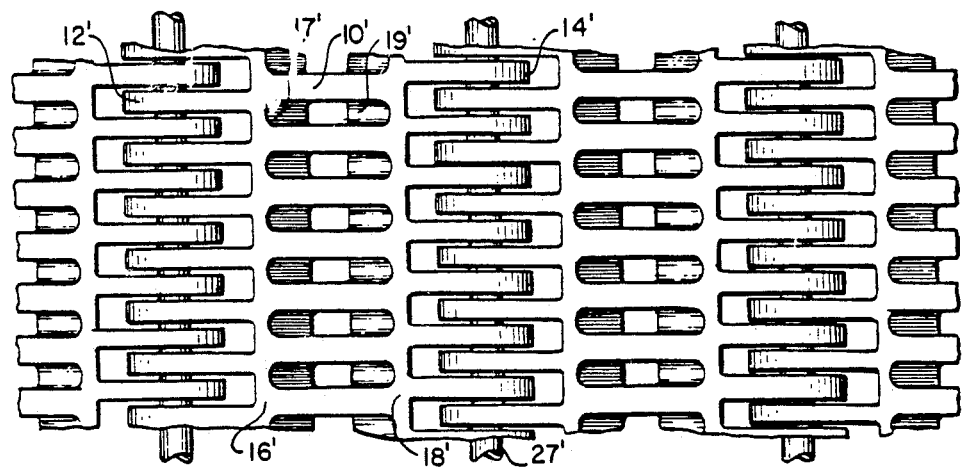
FIG. 17 is a bottom plan view of another embodiment of interconnected conveyor modules embodying the invention.
Figure 18:
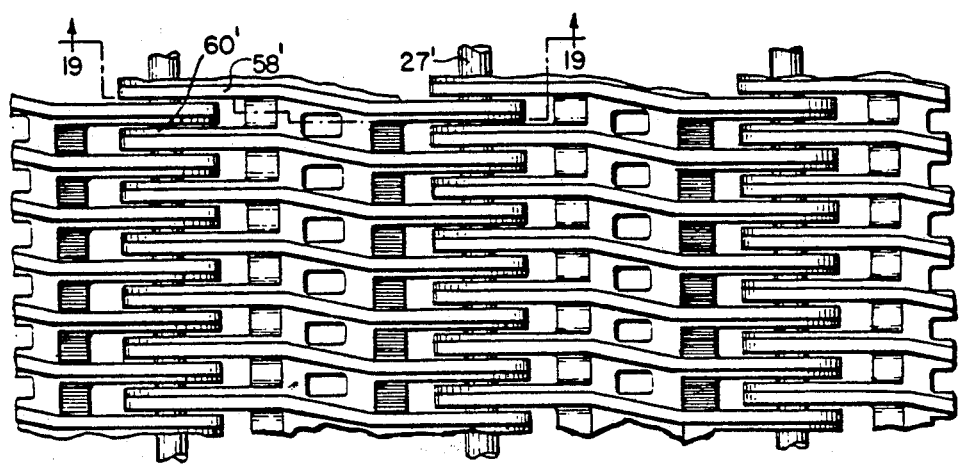
FIG. 18 is a top plan view thereof.
Figures 19, 20, 21:
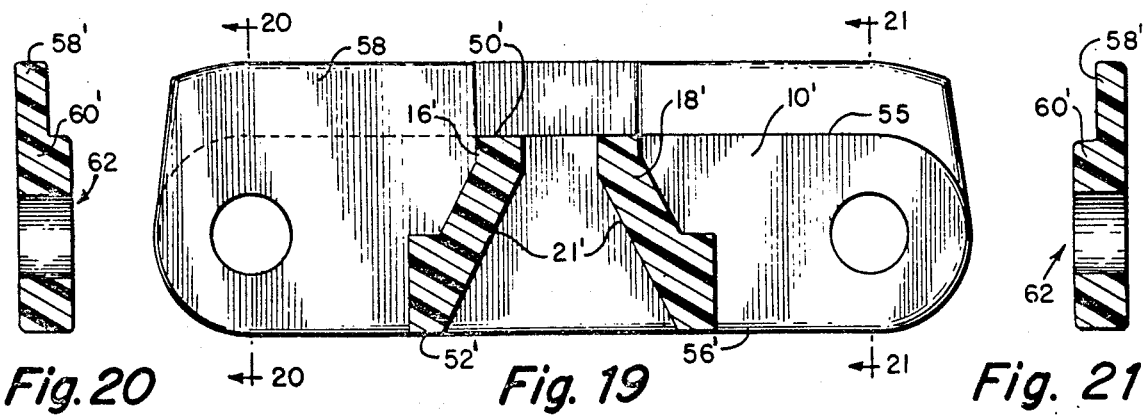
FIG. 19 is a sectional view along the lines 19—19 of FIG. 18.
FIG. 20 is a sectional view along the lines 20—20 of FIG. 19.
FIG. 21 is a sectional view along the lines 21—21 of FIG. 19.

The flat sides of the link ends of one module are in engagement with the flat sides of the link ends of a mated module, as can best be seen in FIG. 17 and 18, to provide a very small offset in the line of pull through the adjacent link elements. As a result, the line of pull through the pivot rod is nearly in a pure shear condition, since the shear point is near the tensile members 10′ thereby minimizing bending forces in the links 10′ and in the link ends. The thickness of the portions 60′ is slightly less than the spacing between adjacent link ends such as the link ends fit within the corresponding spacings of adjacent modules and provide sufficient bearing surface with a pivot rod to accommodate the tensile forces on the belt during its driven operation.

A conveyor comb 34 having the tines 36 may be disposed between the innerspace defined between adjacent stepped ribs 58′ to receive and remove elements onto and off the conveyor module as described above in connection with the description of FIGS. 9 and 10.

Many modifications of the present invention will be apparent to those skilled in the art without departing from the scope of the appended claims.

What is claimed is:

1. A conveyor belt configured to be driven by a plurality of sprocket wheels having teeth, comprising:

a plurality of identical modules of integral molded construction linked together end-to-end to form said conveyor belt, each module including a plurality of link elements of equal length disposed in laterally spaced relation, each of said plurality of link elements having an upper surface, a lower surface and first and second flat sides, said upper surfaces of said plurality of link elements lying in a first plane and said lower surfaces of said plurality of link element lying in a second plane, each module having a length equal to said length of said individual link elements, and wherein each module has a width determined by said pluraltiy of link elements in laterally spaced relation, each of said plurality of link elements terminating in first and second link ends, respectively, said length of each individual link element being defined as the longitudinal distance between corresponding first and second link ends, and wherein a majority of said corresponding first and second link ends including an integral end portion extending transversely from said first flat side of said corresponding link element, each of said plurality of first and second link ends and said corresponding trasversely extending integral end portions having an opening formed therethrough, said openings of each said module defining pivot axes therefor, first and second cross members integrally formed intermediate said first and second link ends to extend transversely between said first and second flat sides of adjacent link elements of the laterally spaced relation, said first and second cross members being angularly disposed with respect to said adjacent link elements to have upper and lower surfaces substantially parallel with said corresponding upper and lower surfaces of said adjacent link elements, said first and second cross members further including outwardly sloping surfaces and confronting sloping surfaces, respectively, said confronting surfaces defining sprocket recesses configured for intermittent engagement with the teeth of the plurality of sprocket wheels to cause longitudinal movement of said module; and a plurality of pivot rods insertable in said openings of said link elements of adjacent modules to link said plurality of identical modules together end-to-end to form said conveyor belt, every other module of said plurality of modules linked end-to-end to form said conveyor belt being rotated 180° to register said first and second link ends, respectively, of adjacent modules wherein said transversely extending integral end portions of said first link ends, respectively, are disposed in confronting engagement to provide a bearing surface for said pivot rod inserted in said corresponding poles of said first link end and said second flat sides, respectively, of link elements of said adjacent modules are engagingly disposed to minimize bending forces in said plurality of link elements and said first and second link ends thereof.

2. The conveyor belt of claim 1 wherein each of said transversely extending end portions of said first and second plurality of link ends is a cylindrical portion, and wherein each said cylindrical portion has a transverse dimension permitting said adjacent modules to be linked together end-to-end with said cylindrical portions in abutting engagement.

3. The conveyor belt of claim 1 wherein said upper surface of each of said plurality of link elements extends upwardly above said upper surfaces of said first and second cross members to define a rib, said ribs of adjacent link elements defining therebetween a parallel longitudinal channel configured to receive a tine of a conveyor comb as said conveyor belt is driven by the plurality of sprocket wheels.

4. A conveyor belt configured to be driven by a plurality of sprocket wheels having teeth, comprising:

a plurality of identical modules of integral molded construction linked together end-to-end to form said conveyor belt, each module including a plurality of link elements of equal length disposed in laterally spaced relation, each of said plurality of link elements having an upper surface, a lower surface and first and second flat sides, each module having a length equal to said length of said individual link elements, and wherein each module has a width determined by said plurality of link elements in laterally spaced relation, each of said plurality of link elements terminating in first and second link ends, respectively, said length of each individual link element being defined as the longitudinal distance between corresponding first and second link ends, and wherein said corresponding first and second link ends of each individual link element are laterally offset with respect to one another and further wherein said corresponding first and second link ends of each individual link element are parallel with respect to one another, each of said plurality of first and second link ends having an opening formed therethrough, said openings of each said module defining pivot axes therefor, a rib integrally formed with and extending upwardly from said upper surface of each of said plurality of link elements, each rib extending from said first link end to said second link end of said corresponding link element, each rib having a width less than said first and second link ends of said corresponding link element to form a stepped configuration with said upper surfaces of transversely extending portions of said corresponding first and second link ends, and wherein said transversely extending end portions of said first and second link ends of each corresponding link element extend transversely in opposite directions with respect to said corresponding rib thereof, first and second cross members integrally formed intermediate said first and second link ends to extend transversely between said first and second flat sides of adjacent link elements of the laterally spaced relation, said first and second cross members being angularly disposed with respect to said adjacent link elements to have upper and lower surfaces substantially parallel with said corresponding upper and lower surfaces of said adjacent link elements, said first and second cross members further including outwardly sloping surfaces and confronting sloping surfaces, respectively, said confronting surfaces defining sprocket recesses configured for intermittent mating with the teeth of the plurality of sprocket wheels to cause longitudinal movement of said module; and a plurality of pivot rods inserted in said openings of said link elements of adjacent modules to link said plurality of identical modules together end-to-end to form said conveyor belt, and wherein said transversely extending end portions of adjacent modules are dispoto-end to form said conveyor belt, and wherein said transversely extending end portions of adjacent 5. The conveyor belt of claim 4 wherein ends of each said rib extending upwardly from said upper surface of said first and second link ends of said corresponding link element are laterally offset with respect to each other.

6. The conveyor belt of claim 4 wherein said plurality of modules linked together end-to-end form said conveyor belt of generally rectangular configuration.

* * * * *